(12) United States Patent
Tam et al.

(10) Patent No.: US 12,423,447 B2
(45) Date of Patent: Sep. 23, 2025

(54) OPTICAL-DIGITAL ENCODING-DECODING SYSTEM

(71) Applicant: Hong Kong Applied Science and Technology Research Institute Company Limited, Hong Kong (CN)

(72) Inventors: Ming Wai Alwin Tam, Hong Kong (CN); Zhiqi Yao, Hong Kong (CN); Kam Ho Samuel Poon, Hong Kong (CN); Man To Chow, Hong Kong (CN); Peisong Hua, Hong Kong (CN); Kin Lung Chan, Hong Kong (CN); Kwok Sing Cheng, Hong Kong (CN)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 158 days.

(21) Appl. No.: 18/399,947

(22) Filed: Dec. 29, 2023

(65) Prior Publication Data
US 2025/0217498 A1 Jul. 3, 2025

(51) Int. Cl.
*G06F 21/60* (2013.01)
*G02B 6/34* (2006.01)
*G02B 5/18* (2006.01)

(52) U.S. Cl.
CPC ............. *G06F 21/602* (2013.01); *G02B 6/34* (2013.01); *G02B 5/1819* (2013.01)

(58) Field of Classification Search
CPC ........ G06F 21/602; G02B 6/34; G02B 5/1819
See application file for complete search history.

(56) References Cited

U.S. PATENT DOCUMENTS

| 10,366,222 B2 | 7/2019 | Daly et al. |
| 11,055,590 B2 | 7/2021 | Ragusa et al. |

(Continued)

FOREIGN PATENT DOCUMENTS

| CN | 112074787 A | 12/2020 |
| CN | 116016952 A | 4/2023 |

(Continued)

OTHER PUBLICATIONS

International Search Report and Written Opinion of PCT application No. PCT/CN2024/071990 issued from the International Search Authority on Jan. 12, 2024.

*Primary Examiner* — Sangseok Park
(74) *Attorney, Agent, or Firm* — S&F/WEHRW

(57) ABSTRACT

Anti-counterfeiting is benefited by integrating both optical and digital encoding-decoding approaches for spoof protection, e.g., in print anti-spoofing. An optical-digital encoding-decoding system uses an encoded medium, such as a security label, to display images encoded with digital data, and a decoding device to decode or decrypt the digital data for achieving stronger authentication in anti-counterfeiting or other security-related purposes. The images are encoded into resonant waveguide gratings (RWGs) in the encoded medium, enabling angle multiplexing of the displayed images and addressing different secrecy requirements in optically handling different groups of security-related data. Furthermore, aperiodic diffraction gratings instead of periodic ones are used in RWGs for selected images intended to be viewed by users, broadening beamwidths of outgoing light beams generated by these RWGs to allow the selected images to be more conveniently viewed by the users over a wider range of angle.

17 Claims, 10 Drawing Sheets

(56) References Cited

U.S. PATENT DOCUMENTS

| | | | |
|---|---|---|---|
| 11,361,397 B2 | 6/2022 | Zheng et al. | |
| 2017/0239974 A1 | 8/2017 | Finlayson et al. | |
| 2018/0121775 A1 | 5/2018 | Sharma et al. | |
| 2019/0384955 A1 | 12/2019 | Frieser et al. | |
| 2021/0150295 A1 | 5/2021 | Rangaprasad et al. | |
| 2021/0297252 A1 | 9/2021 | Licciardello et al. | |
| 2022/0016923 A1* | 1/2022 | Ben Aziza | G02B 5/203 |
| 2022/0179135 A1* | 6/2022 | Rodrigues | H04N 23/54 |

FOREIGN PATENT DOCUMENTS

| | | |
|---|---|---|
| EP | 3205512 B1 | 6/2018 |
| WO | 2012131239 A1 | 10/2012 |
| WO | 2013117834 A1 | 8/2013 |
| WO | 2015096859 A1 | 7/2015 |
| WO | 2017159608 A1 | 9/2017 |
| WO | 2021257527 A1 | 12/2021 |
| WO | 2022254025 A1 | 12/2022 |

\* cited by examiner

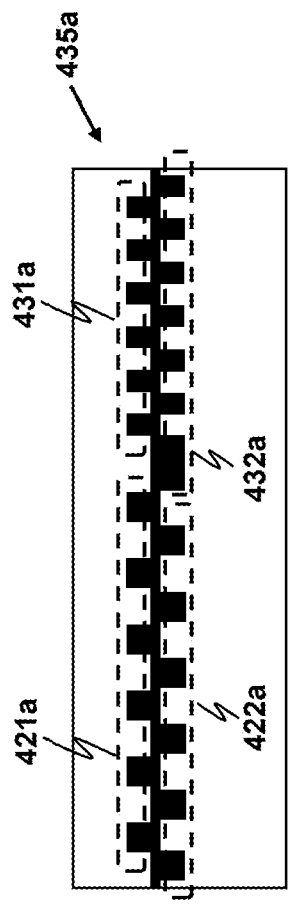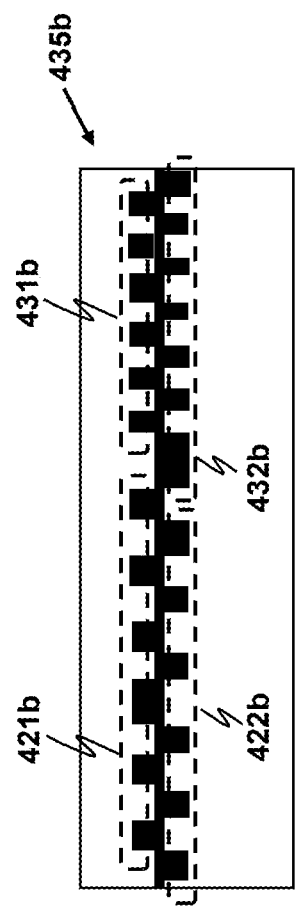

OPTICAL-DIGITAL ENCODING-DECODING SYSTEM

LIST OF ABBREVIATIONS

IR infrared
QR quick response
RWG resonant waveguide grating
UV ultraviolet

FIELD OF THE INVENTION

The present disclosure relates to an optical-digital encoding-decoding system of using an encoded medium, such as a security label attached to an article, to optically and semi-covertly transmit a plurality of images embedding digital information to a decoding device for decoding or decrypting the digital information to thereby perform some security-related functions, such as authentication.

BACKGROUND

Anti-counterfeiting techniques are used in many application areas such as automatic document control and fake-goods detection. Without strong anti-counterfeiting features provided to products and articles, it often results in significant monetary loss, health and safety risk and hence creates adverse social and economical impacts. At present, optical encoding-decoding systems for anti-counterfeiting are often based on using holograms for proof of authenticity. However, fake look-alikes duplication is an inexpensive approach to overcome anti-counterfeiting. Using holograms for anti-counterfeiting also lacks uniqueness. Furthermore, it is difficult to recognize holograms from digital readers due to large color shifts of the holograms at different angles, making digital template matching difficult. In short, overt hologram features are insufficient for security labels and packaging. Alternatively, digital encoding-decoding systems for anti-counterfeiting employ sophisticated algorithms for authentication. These algorithms are often complex. The digital encoding-decoding systems for authentication are usually more expensive to implement than the optical ones. Furthermore, using the digital encoding-decoding systems for anti-counterfeiting inevitably opens up opportunities for adversaries to initiate cyber-attacks. In general, existing anti-counterfeiting systems lack integrating both optical and digital encoding-decoding approaches for spoof protection. There is a need in the art for developing an optical-digital encoding-decoding system for security-related applications in general and anti-counterfeiting applications in particular.

SUMMARY OF THE INVENTION

Provided herein is an optical-digital encoding-decoding system. An important component in the system is an encoded medium for supporting optical encoding of plural groups of data in the form of images.

A first aspect of the present disclosure is to provide an encoded medium for displaying a plurality of images in an angle-multiplexed manner.

The encoded medium comprises a display area for displaying the plurality of images, and a plurality of RWG groups for respectively creating the plurality of images on the display area. The display area is pixelated into a set of pixels. Each image is associated with a subset of pixels for image display on the display area. For the plurality of RWG groups, an individual RWG group is associated with an outgoing-beam propagation direction with respect to the display area, and consists of plural member RWGs each configured to generate an outgoing light beam propagated along the outgoing-beam propagation direction. The member RWGs are distributed over the subset of pixels associated with a first certain image that is selected from the plurality of images and intended to be created by the individual RWG group such that each pixel in the subset of pixels associated with the first certain image is allocated with at least one of the member RWGs. Respective RWG groups in the plurality of RWG groups are further configured to provide different respective outgoing-beam propagation directions for achieving an advantage of angle-multiplexing the plurality of images in image display.

Preferably, an individual pixel in the set of pixels is partitioned into a plurality of subpixels. The plurality of subpixels is respectively assigned to the plurality of RWG groups for member-RWG allocation in the individual pixel.

In certain embodiments, the individual pixel in the set of pixels is two-dimensionally partitioned into the plurality of subpixels such that respective subpixels in the plurality of subpixels are distributed on the individual pixel.

In certain embodiments, the individual pixel in the set of pixels is three-dimensionally partitioned into the plurality of subpixels such that respective subpixels in the plurality of subpixels are distributed over a plurality of planar layers formed along a normal direction to the display area.

In certain embodiments, an assignment scheme for respectively assigning the plurality of subpixels located at a certain pixel to the plurality of RWG groups varies over the set of pixels for increasing a cost incurred by an adversary in reverse-engineering the encoded medium.

Preferably, the plurality of RWG groups includes one or more selected RWG groups. An individual member RWG in an individual selected RWG group comprises an in-coupling diffraction grating, an out-coupling diffraction grating, and a waveguide connected to the in-coupling and out-coupling diffraction gratings. Each of the in-coupling and out-coupling diffraction gratings is an aperiodic diffraction grating rather than a periodic one, causing a beamwidth of the outgoing light beam generated by the individual member RWG in the individual selected RWG group to be broadened to thereby allow a second certain image selected from the plurality of images and intended to be created by the individual selected RWG group to be viewable over a wider range of angle.

In certain embodiments, the aperiodic diffraction grating is formed with one or two aperiodic arrangements of nano-structured elements. An individual aperiodic arrangement of nano-structured elements has a phase profile given by a periodic phase profile superimposed with a weakly-perturbed aperiodic phase profile.

In certain embodiments, the weakly-perturbed aperiodic phase profile is a parabolic or quartic function modulo 21.

In certain embodiments, the aperiodic diffraction grating is formed with one or two aperiodic arrangements of nano-structured elements. Each nano-structured element is curved rather than linear, causing the beamwidth of the outgoing light beam generated by the individual member RWG in the individual selected RWG group to be further broadened.

In certain embodiments, the aperiodic diffraction grating is formed with two aperiodic arrangements of nano-structured elements. The two aperiodic arrangements of nano-structured elements are respectively positioned on two opposite sides of the waveguide.

In certain embodiments, the aperiodic diffraction grating is formed with one or two aperiodic arrangements of nano-structured elements. Each nano-structured element has a cross-sectional shape selected from a rectangular shape, a triangular shape, a sinusoidal shape and a slanted rectangular shape.

In certain embodiments, each member RWG in the plurality of RWG groups comprises an in-coupling diffraction grating, an out-coupling diffraction grating, and a waveguide connected to the in-coupling and out-coupling diffraction gratings. The in-coupling and out-coupling diffraction gratings are periodic diffraction gratings mutually different in grating periodicity.

In certain embodiments, the plurality of RWG groups includes one or more selected RWG groups. A corresponding outgoing light beam associated with an individual selected RWG group has a spectral content outside a visible spectrum of human beings. It causes a third certain image selected from the plurality of images and intended to be created by the individual selected RWG group to be invisible to human beings to thereby allow the third certain image to carry hidden information.

In certain embodiments, the encoded medium is a security label attached to an article. The plurality of images includes a first image of a logo or trademark for brand identification of the article, and a second image of a QR code containing digital data used for authentication of the article.

A second aspect of the present disclosure is to provide an optical-digital encoding-decoding system.

The system comprises any of the embodiments of the encoded medium, and a decoding device. The encoded medium is used for displaying a plurality of images in an angle-multiplexed manner. The decoding device comprises: a camera for optically retrieving the plurality of images from the encoded medium; and a computing processor configured to execute a computing process for controlling the camera to retrieve the plurality of images and processing the retrieved plurality of images.

In certain embodiments, the decoding device further comprises a light source for controllably illuminating the encoded medium.

In certain embodiments, the plurality of images includes first and second images. The first image is encoded with a first body of pixelated information. The second image is encoded with a second body of pixelated information. The second body of pixelated information includes an encrypted message and an encoded key. The decoding device is stored with: a first group of information data for verifying the first body of pixelated information; a decryption key for decrypting the encrypted message; a second group of information data for verifying the encrypted message after decryption; and a decoding key for assisting decoding of remaining images in the plurality of images other than the first and second images. Furthermore, the computing process comprises: controlling the camera to retrieve the second image; extracting the encrypted message and the encoded key from the retrieved second image; decrypting the encrypted message by the decryption key to yield a decrypted message; controlling the camera to retrieve the first image; verifying whether the first body of pixelated information matches the first group of information data; verifying whether the decrypted message matches the second group of information data; responsive to finding that the first body of pixelated information matches the first group of information data and the decrypted message matches the second group of information data, combining the decoding key, the first body of pixelated information and the encoded key to form a complete decryption key used for decoding the remaining images; controlling the camera to retrieve the remaining images; and using the complete decryption key for decoding the remaining images.

Other aspects of the present disclosure are disclosed as illustrated by the embodiments hereinafter.

BRIEF DESCRIPTION OF THE DRAWINGS

FIG. 4A depicts a cross-sectional view of a first member RWG realized with periodic diffraction gratings.

FIG. 4B depicts a cross-sectional view of a second member RWG realized with periodic diffraction gratings.

Skilled artisans will appreciate that elements in the figures are illustrated for simplicity and clarity and have not necessarily been depicted to scale.

DETAILED DESCRIPTION

An optical-digital encoding-decoding system is conceptualized as a system that mixes the optical and digital domains in encoding and decoding data for achieving some security-related purposes. Mixing the optical and digital domains may be achieved, for instance, by using an optical technique to hide digital information while allowing an intended observer to obtain and decode (or decrypt) the hidden digital information, and then using the decoded digital information to modify an optical process of the optical technique in handling additional digital information via appropriate encoding or decoding. The mixing of the optical and digital domains, if used for authentication purposes, makes authentication more robust. More robust authentication offered by means of the disclosed optical-digital encoding-decoding system is useful in many applications, for instance, in print anti-spoofing.

Figure 8:
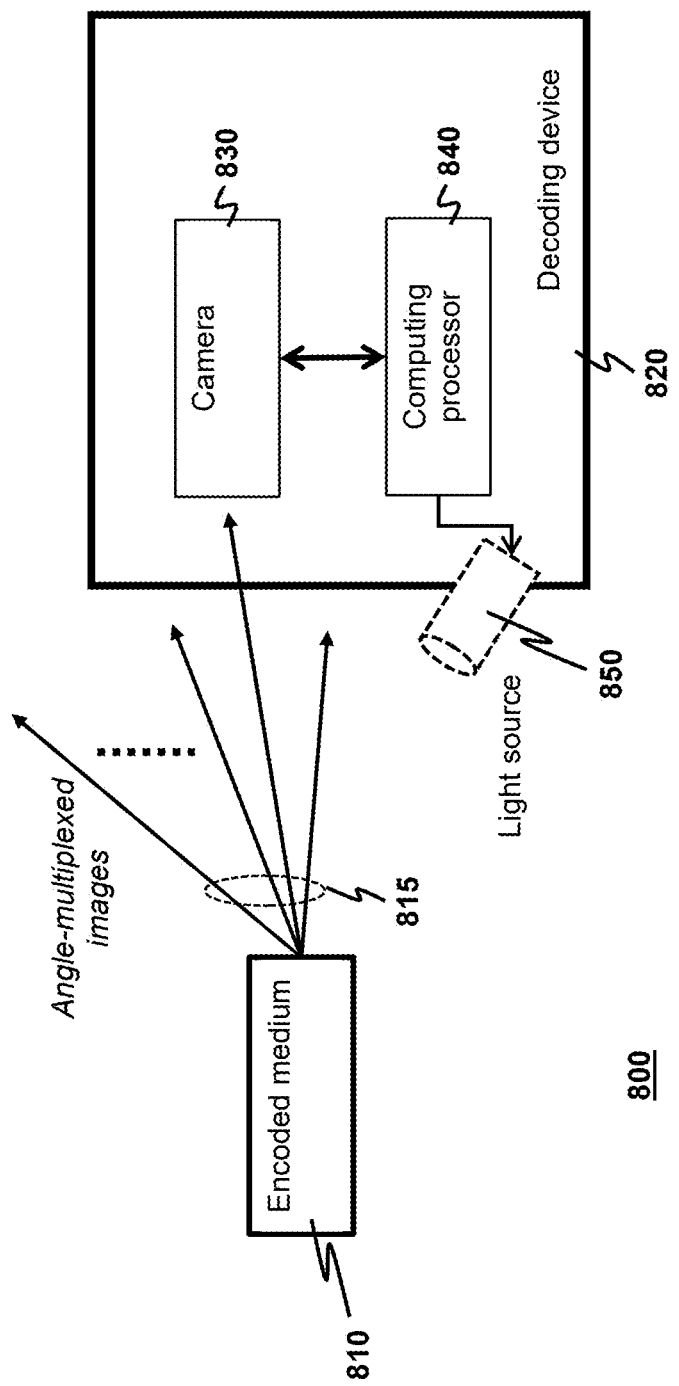
FIG. 8 depicts an exemplary schematic model of the disclosed optical-digital encoding-decoding system, where the system comprises the encoded medium and a decoding device, where the decoding device is used for decoding retrieved images from the encoded medium.

In FIG. 8, an exemplary model 800 of the optical-digital encoding-decoding system as considered herein is shown. In the model 800, a plurality of angle-multiplexed images 815 is produced by an encoded medium 810. One or more images from the plurality of angle-multiplexed images 815 are selected and decoded by a decoding device 820.

In developing the optical-digital encoding-decoding system, the Inventors have found that the encoded medium 810 is required to support optical encoding of plural groups of security-related data. The encoded medium 810 may be a security label, a chip, a card, etc., with an area for optically displaying a plurality of images. Some groups of data, similar to a hologram, are intended to be visible and plainly understandable by users for achieving quick authentication. Some groups of data, such as data encoded in a QR code, are intended to be readable and subsequently decoded by a machine (such as a smartphone) for robust authentication. Yet some groups of data are designed to be highly hidden (covert) from general users and are intended to be readable and subsequently decoded by a sophisticated machine of some specialist users for very robust authentication or even forensic analysis. To achieve the aforementioned diversity of sophistication in optically handling such different groups of security-related data or to satisfy different secrecy requirements for these groups, the Inventors have found that the encoded medium 810 for optically encoding these data can be advantageously realized by means of RWGs.

Figure 1:
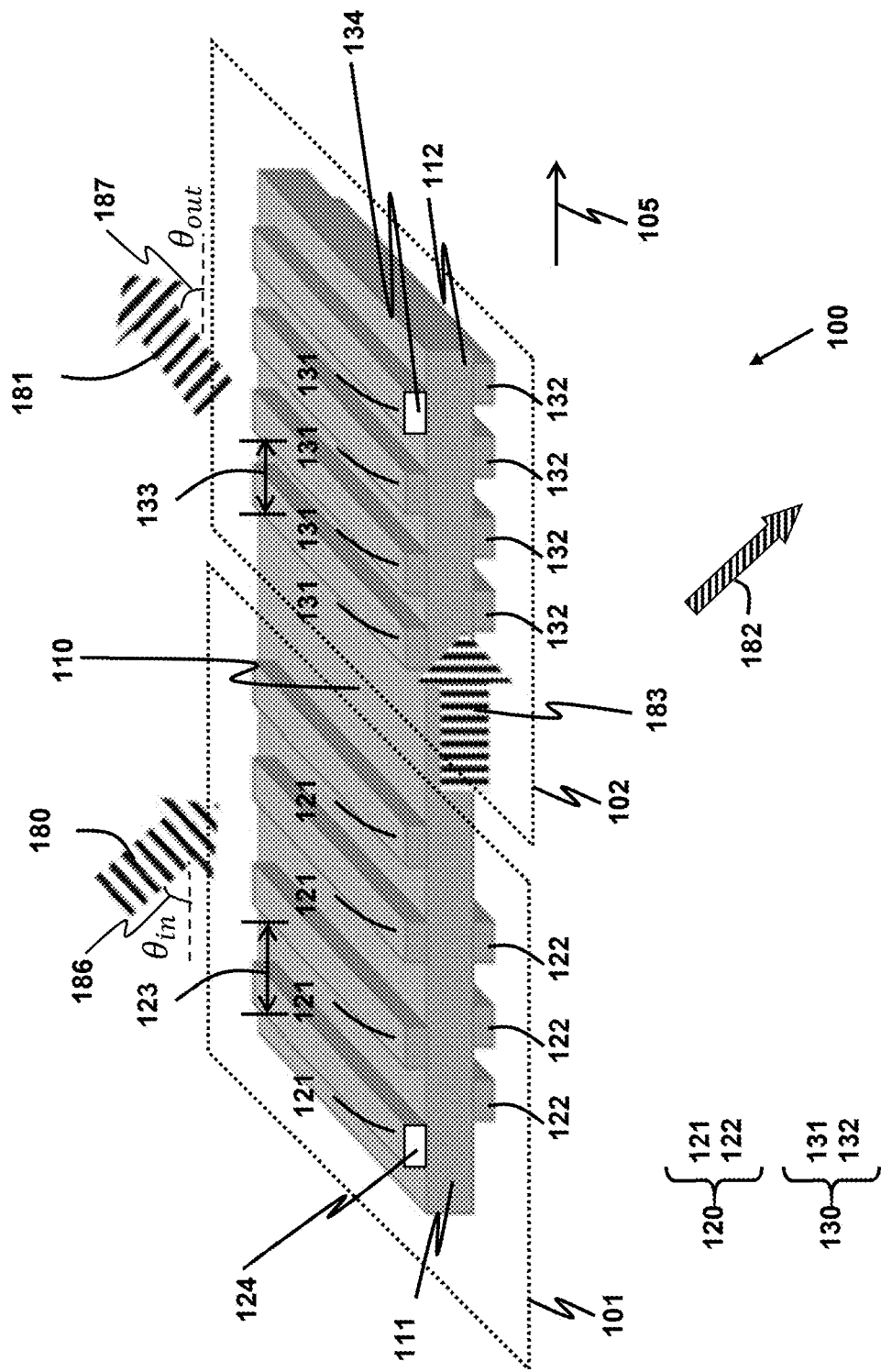
FIG. 1 depicts a typical structure of a RWG for illustration purposes.

Before embodiments of the present disclosure are detailed, technical details of RWGs necessary for developing the embodiments are presented as follows with the aid of FIG. 1. FIG. 1 depicts a typical structure of a RWG 100.

The RWG 100 is intended to reflect a light beam if the light beam has a certain wavelength and enters into the RWG 100 at a certain incident angle. The RWG 100 comprises a waveguide 110, a first diffraction grating 120 and a second diffraction grating 130. The first and second diffraction gratings 120, 130 are attached to the waveguide 110. The waveguide 110 is formed by a dielectric having a refractive index higher than a surrounding environment in the vicinity of the waveguide 110. The dielectric is transparent to a light beam whose wavelength is within an intended working range of wavelengths of the RWG 100. The first diffraction grating 120 is obtained by arranging plural nano-structured elements 121, 122 on one side or both sides of the waveguide 110. If the nano-structured elements are arranged on both sides (on one side), the first diffraction grating 120 has the nano-structured elements 121, 122 (121 only). Similarly, the second diffraction grating 130 has nano-structured elements disposed on one side (with nano-structured elements 131 only) or both sides (with nano-structured elements 131, 132) of the waveguide 310.

In each of the first and second diffraction gratings 120, 130, each group of nano-structured elements (121, 122, 131 or 132) may be periodically arranged or non-periodically arranged. A periodical arrangement of nano-structured elements has a grating period that is spatially invariant, such that the periodical arrangement of nano-structured elements forms a periodic diffraction grating. A grating period is a length between adjacent nano-structured elements. For example, the nano-structured elements 121 have a first grating period 123 and the nano-structured elements 131 have a second grating period 133. A non-periodical arrangement of nano-structured elements, on the other hand, has non-identical grating periods for different pairs of adjacent nano-structured elements. Although the grating periods are not the same, the grating periods usually differ slightly or have only a small number of outliers so that a representative grating period can be found. Unless otherwise stated, herein a representative grating period of a non-periodic arrangement of nano-structured elements is also referred to as a grating period. The non-periodic arrangement of nano-structured elements forms an aperiodic diffraction grating.

As examples shown on FIG. 1, the first diffraction grating 120 is formed with two periodic arrangements of nano-structured elements 121, 122 respectively located on two opposite sides of the waveguide 310. Note that each of the two periodic arrangements of nano-structured elements 121, 122 forms a corrugated structure. It is similar for the second diffraction grating 130. Also note that the RWG 100 has an orientation along a direction 105. The orientation of the RWG 100 is perpendicular to the nano-structured elements 121, 122 in the first diffraction grating 120, or to the nano-structured elements 131, 132 in the second diffraction grating 130.

The first and second diffraction gratings 120, 130 are located on different portions of the waveguide 110. Define a first waveguide portion 111 as a first portion of the waveguide 110 on which the first diffraction grating 120 is laid. Similarly, define a second waveguide portion 112 as a second portion of the waveguide 110 on which the second diffraction grating 130 is laid. For convenience, define a first RWG portion 101 and a second RWG portion 102 as mutually non-overlapping portions of the RWG 100 such that the first RWG portion 101 has the first waveguide portion 111 and the first diffraction grating 120, and such that the second RWG portion 102 has the second waveguide portion 112 and the second diffraction grating 130. Note that the first and second RWG portions 101, 102 are coupled together. In particular, the first and second waveguide portions 111, 112 are linked together for achieving coupling.

The first and second diffraction gratings 120, 130 are characterized by the first grating period 123 and the second grating period 133, respectively. The two grating periods 123, 133 collectively determine a resonance condition of the RWG 100. The first grating period 123 and the orientation 105 can be selected such that an incoming light beam 180 specifically prepared to have a first preselected wavelength $\lambda_1$ and arrive at a first preselected (elevation) angle $\theta_{in}$ 186 with respect to the waveguide 110 resonates with the RWG 100, causing the incoming light beam 180 to couple-in the RWG 100 and propagate along the waveguide 110 in the waveguide mode as an in-waveguide light beam 183. As such, the first diffraction grating 120 is referred to as an in-coupling diffraction grating 120, and the first RWG portion 101 is also referred to as an in-coupling RWG portion 101. The second grating period 133 can also be selected such that an outgoing light beam 181 having the wavelength $\lambda_1$ and leave at a second preselected (elevation) angle $\theta_{out}$ 187 with respect to the waveguide 110 resonates with the RWG 100, causing the in-waveguide light beam 183 to couple out of the RWG 100 and form the outgoing light beam 181. Mathematical formulas for determining the grating period from $\lambda_1$ and $\theta_{in}$ 186 or $\theta_{out}$ 187 can be found in the art, for example, in EP 3,205,512 and in G. QUARANTA, G. BASSET, O. J. F. MARTIN and B. GALLINET, "Recent Advances in Resonant Waveguide Gratings," *Lasers & Electronics Reviews*, 30 Jul. 2018. Note that since the RWG 100 is usually used to interact with the incoming light beam 180 in the visible spectrum, the near-IR spectrum and possibly the UV spectrum, the waveguide 110 and the first and second diffraction gratings 120, 130 are usually dimensioned in nanoscale, and are implemented as nanostructures.

Consider that the incoming light beam 180 is incident on the in-coupling RWG portion 101 at an incident angle, viz., $\theta_{in}$ 186. If the wavelength and incident angle of the incoming light beam 180 meet the resonance condition of the in-coupling RWG portion 101 and if the last-mentioned wavelength satisfies the resonance condition of the out-coupling RWG portion 102, then the in-coupling RWG portion 101 couples-in the incoming light beam 180 to form the in-waveguide light beam 183 propagating from the first waveguide portion 111 to the second waveguide portion 112, at which the in-waveguide light beam 183 is coupled-out from the out-coupling RWG portion 102 with a predetermined exit angle, viz., $\theta_{out}$ 187, to form the outgoing light beam 181.

Note that in practice, the outgoing light beam 181 is not an absolutely collimated light beam. Practically, the outgoing light beam 181 is a diverging beam but the beamwidth of the outgoing light beam 181 is often very narrow. The exit angle $\theta_{out}$ 187 is determined by identifying a direction of the outgoing light beam 181 having a peak in radiation power density.

Conversely, if the incoming light beam 180 does not meet any one of the resonance conditions of the in-coupling and out-coupling RWG portions 101, 102, the incoming light beam 180 does not interact with the RWG 100 and simply bypasses the RWG 100 to form a bypassed light beam 182. As a result, it avoids interfering the incoming light beam 180 that is out of resonance with the RWG 100 when the incoming light beam 180 propagates through the RWG 100.

The presence of resonance condition(s) in the RWG 100 can be advantageously used in the following settings. First, the RWG 100 can be used to produce a reflection of light if the incoming light beam 180 (also referred to as the incident light beam 180 for convenience) has wavelength and incident angle that collectively cause the RWG 100 to resonate. By installing multiple copies of the RWG 100 at locations that form a certain pattern, an image following this pattern is formed by light beams reflected by the pattern. Second, the incident light beam 180, which usually has multiple spectral contents and arrives at the RWG 100 from different directions, can at least partially transmit through the RWG 100 to illuminate other RWGs if installed. Multiple images can be displayed by using different groups of RWGs, where each group has a particular setting on RWG resonance conditions such that different RWG groups generate different images at different exit angles. Hence, different images may be displayed in an angle-multiplexing manner. One displayed image does not interfere with another displayed image.

If the first and second grating periods 123, 133 take on the same value, the RWG 100 basically becomes a conventional RWG as described in the paper of G. QUARANTA, G. BASSET, O. J. F. MARTIN and B. GALLINET. As a result, multiple values of $\lambda_1$ may induce resonance in the RWG 100 and also the values of $\theta_{in}$ or $\theta_{out}$ affect each other. This result may not be preferable in major applications of the present disclosure. Hence, the first and second grating periods 123, 133 are selected to be different in order to set a unique resonance condition for the RWG 100. As a result, with a suitable choice of other RWG parameters such as the waveguide dielectric refractive index, gratings depth, etc., it becomes feasible to configure the RWG 100 to resonate at only one value of wavelength. The net effect is that the RWG 100 filters a received portion of the incident light beam 180 and generates the outgoing light beam 181 having a predictable wavelength and leaving the RWG 100 at a predictable exit angle.

As mentioned above, the first and second waveguide portions 111, 112 have a common refractive index higher than the refractive index of surrounding environment. By taking into account the refractive index difference, the first and second waveguide portions 111, 112 and the first and second diffraction gratings 120, 130 may be dimensioned to provide single-mode propagation along the first and second waveguide portions 111, 112 (or the waveguide 110) for an advantage of enhancing spectral/angular selectivity in generation of multiple images.

As an example shown in FIG. 1, the nano-structured elements 121, 122, 131, 132 used in the in-coupling and out-coupling diffraction gratings 120, 130 have rectangular cross-sections 124, 134. In practical implementation, each nano-structured element may have a cross-sectional shape selected from a rectangular shape, a triangular shape, a sinusoidal shape, a slanted rectangular shape, etc.

A first aspect of the present disclosure is to provide an encoded medium for displaying a plurality of images in an angle-multiplexed manner.

Figure 2:
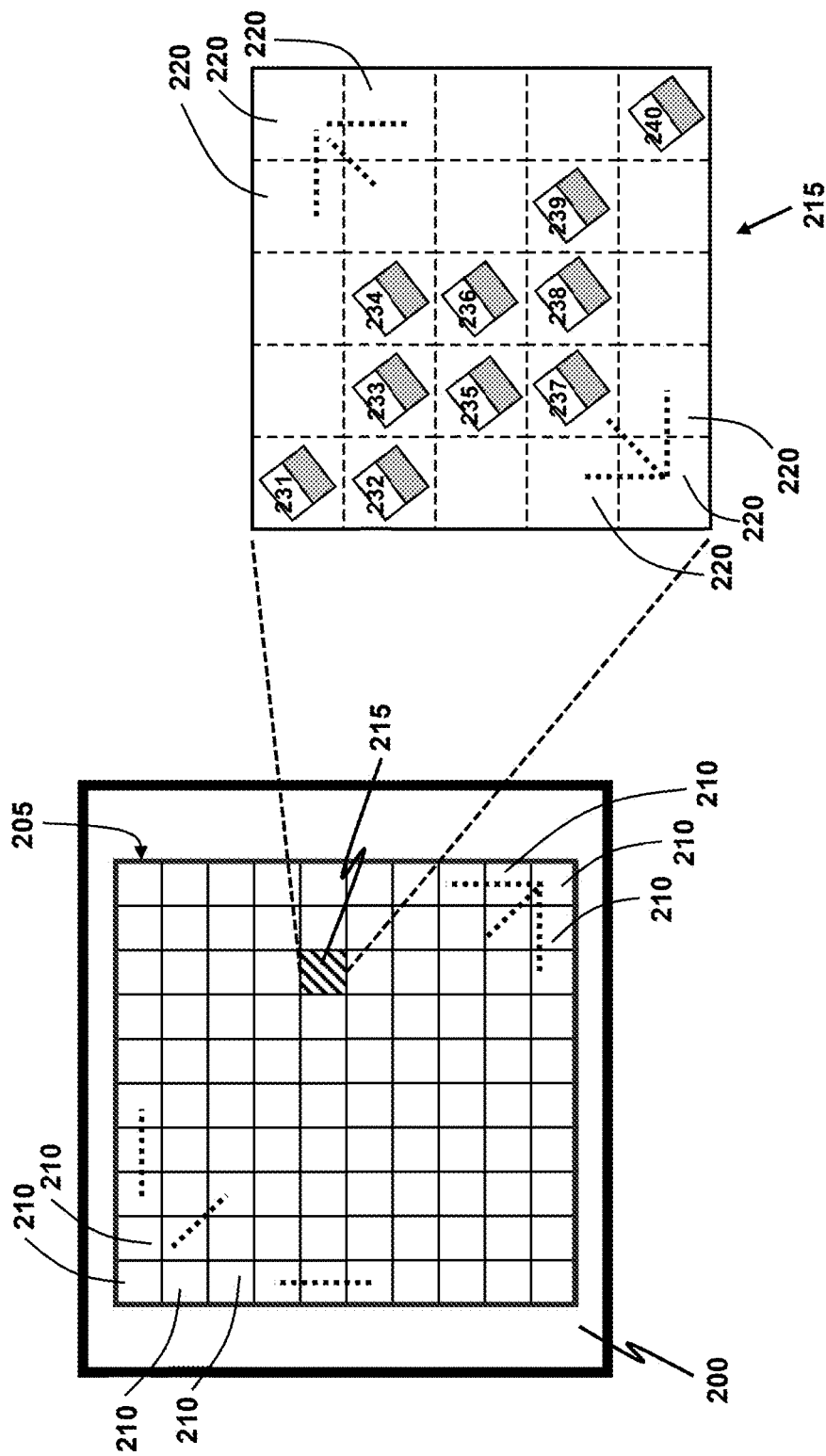
FIG. 2 depicts a structure of an encoded medium as employed in a disclosed optical-digital encoding-decoding system in accordance with an exemplary embodiment of the present disclosure, where the encoded medium has a display area partitioned into a plurality of pixels, an individual pixel being (two-dimensionally) partitioned into a plurality of subpixels for displaying different images.

FIG. 2 depicts a structure of an exemplary encoded medium 200. The encoded medium 200 comprises a display area 205 and a plurality of RWG groups. The plurality of images for display in the display area 205 is stored in the encoded medium 200 in the sense that the plurality of images is encoded in the plurality of RWG groups. Each RWG group is encoded with one image selected from the plurality of images.

The display area 205 is used for displaying the plurality of images. The display area 205 is pixelated into a set of pixels 210. An individual image in the plurality of images is associated with a subset of pixels for image display on the display area 205. The subset of pixels defines which pixels in the set of pixels are lighted on to form the individual image on the display area 205.

The plurality of RWG groups is used for respectively creating the plurality of images on the display area 205. An individual RWG group consists of a plurality of member RWGs, and is associated with an outgoing-beam propagation direction 187 with respect to the display area 205. Each of member RWGs in the plurality of member RWGs is configured to generate an outgoing light beam 181 propagated along the outgoing-beam propagation direction 187 that is associated with the individual RWG group. The member RWGs are distributed over the subset of pixels, where the subset of pixels is associated with a first certain image selected from the plurality of images and intended to be created by the individual RWG group. Each pixel in the subset of pixels associated with the first certain image is allocated with at least one of the member RWGs. As a result, all the member RWGs collectively create a pattern that forms the aforesaid first certain image via reflecting the incoming light beam 180 incident to each of the member RWGs. Respective RWG groups in the plurality of RWG groups are further configured to provide different respective outgoing-beam propagation directions for angle-multiplexing the plurality of images in image display.

As mentioned above, the member RWGs in the individual RWG group have the same outgoing-beam propagation direction 187. In certain embodiments, the member RWGs in the individual RWG group are identical and each of these member RWGs is realized as a copy of a certain RWG model. It follows that all these member RWGs reflects incoming light beams having the same incident angle 186. In many practical applications, it is more desirable to reflect incoming light beams incident from a wider range of incident angles. In this way, more light can be captured from ambient light for reflection. In certain embodiments, the member RWGs in the individual RWG group are individually tailored in grating pitch such that the member RWGs have respective incident angles that in-couple light covering a wider range of angles while keeping the same outgoing-beam propagation direction 187.

To facilitate practical implementation of the encoded medium 200, an individual pixel (e.g., a pixel 215) in the set of pixels 210 may first be partitioned into a plurality of subpixels (e.g., subpixels 220 in the pixel 215). The plurality of subpixels is respectively assigned to the plurality of RWG groups for member-RWG allocation in the individual pixel. In one embodiment, respective subpixels in the plurality of subpixels are assigned to different RWG groups. It follows that the number of different RWG groups in the encoded medium 200 is the number of subpixels in one pixel. The number of images that can be supported to be displayed on the display area 205 is the number of subpixels in one pixel. Hence, maximum utilization of the subpixels for image display is obtained. In another embodiment, the number of subpixels in one pixel is greater than the number of respective RWG groups in the plurality of RWG groups used in the encoded medium 200. More-than-one subpixels on a pixel may be assigned to the same image selected from the plurality of images in image display, resulting in a brighter pixel in comparison to the case of assigning only one subpixel per pixel to the image. Alternatively, one subpixel may still be assigned to one RWG group while unassigned subpixel(s) in one pixel due to exhaustion of available RWG groups (i.e. exhaustion of available images to be displayed) are left unused.

As an illustrative example shown in FIG. 2, the display area 205 is partitioned into a 10×10 array of pixels 210. For illustration, one of the 100 pixels is the pixel 215. The pixel 215 is divided into a 5×5 array of subpixels 220. On the pixel 215, there are ten RWGs 231-240 in total. Each one of the RWGs 231-240 produces a "light dot" on the pixel 215 at a specific wavelength and a specific outgoing-beam propagation direction for displaying an image pixel of a certain image in the plurality of images. The simultaneous display of light dots on different pixels over the subset of pixels associated with the aforesaid certain image displays this image.

In certain embodiments, the individual pixel in the set of pixels is two-dimensionally partitioned into the plurality of subpixels such that respective subpixels in the plurality of subpixels are distributed on the individual pixel. For example, the pixel 215 is partitioned into the plurality of subpixels 220, and these subpixels 220 are organized as a 5×5 planar array of subpixels.

Figure 3:
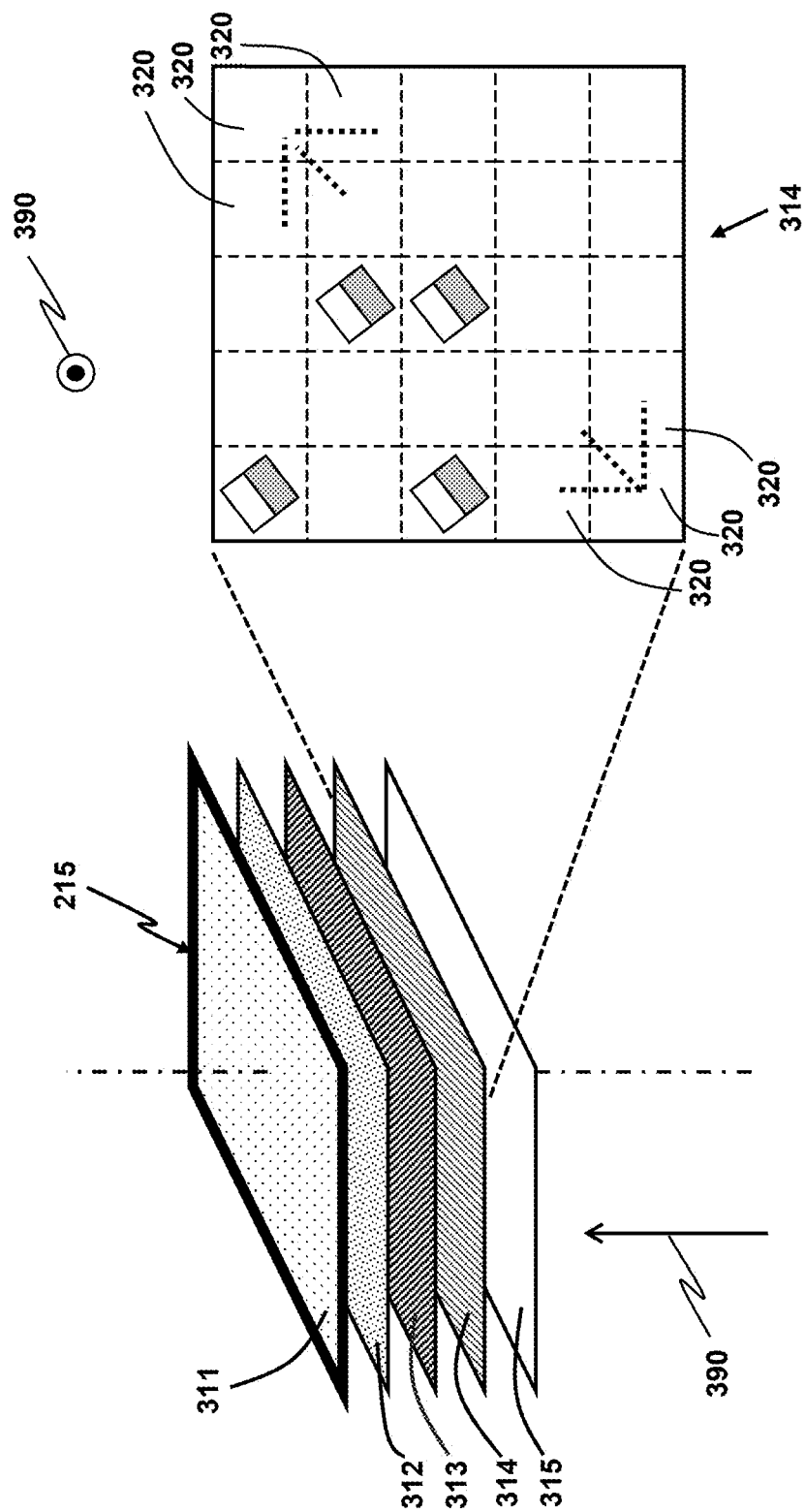
FIG. 3 depicts an arrangement of three-dimensionally partitioning the pixel on the display area of the encoded medium into a plurality of layers of subpixels.

Instead of doing a two-dimensional partition of the individual pixel, the individual pixel may be partitioned three-dimensionally. In certain embodiments, the individual pixel in the set of pixels is three-dimensionally partitioned into the plurality of subpixels such that respective subpixels in the plurality of subpixels are distributed over a plurality of planar layers formed along a normal direction to the display area 205. As an example for illustration, FIG. 3 depicts an arrangement of three-dimensionally partitioning the pixel 215 into a plurality of layers 311-315 of subpixels. The layer 314 is chosen for illustration and this layer is a 5×5 planar array of subpixels 320. The layers 311-315 are located at different depths along a direction 390. The direction 390 is perpendicular to the display area 205. Instead of partitioning the layer 314 into the 5×5 planar array of subpixels 320, other choices of array size are possible, such as 3×5, 3×3, 3×1 and 2×2. In certain embodiments, each of the layers 311-315 is not partitioned and has only one subpixel, equivalent to selecting a 1×1 array of subpixel. Different images in the plurality of images are created at different layers in each pixel.

To keep a simple design of the encoded medium 200, in one embodiment, all the pixels 210 adopt a same assignment scheme of respectively assigning the plurality of subpixels located at the individual pixel to the plurality of RWG groups. Alternatively, in another embodiment, an assignment scheme for respectively assigning the plurality of subpixels located at a certain pixel to the plurality of RWG groups varies over the set of pixels 210. That is, at least two of respective assignment schemes for different pixels on the display area 205 are different. In one special case, all the respective assignment schemes are randomly generated such that it is almost sure that any two of the respective assignment schemes are different. Although the design of the encoded medium 200 is made more complicated, using different assignment schemes over the set of pixels 210 has an advantage of increasing a cost incurred by an adversary in reverse-engineering the encoded medium 200. Deterring or hindering the adversary in discovering security features of the encoded medium 200 or any covert information carried in the plurality of images is important.

Details of design and implementation of an individual member RWG in each RWG group are elaborated as follows.

The individual member RWG adopts the model of the RWG 100 as disclosed above. The individual member RWG comprises an in-coupling diffraction grating 120, an out-coupling diffraction grating 130, and a waveguide 110 connected to the in-coupling and out-coupling diffraction gratings 120, 130.

In certain embodiments, the in-coupling and out-coupling diffraction gratings 120, 130 are periodic diffraction gratings mutually different in grating periodicity so that the first and second grating periods 123, 133 are different. By using periodic diffraction gratings for the in-coupling and out-coupling diffraction gratings 120, 130, the beamwidth of the outgoing light beam 181 can be controlled to be very narrow.

On one hand, having a very narrow beamwidth is advantageous in the context of data hiding, in that an adversary is somewhat hindered to capture the displayed image, especially if the displayed image is deliberately designed to be noise-like without easily recognizable features. On the other hand, if the image displayed by a certain RWG group having the individual member RWG is intended to be viewed by a legitimate user, having a very narrow beamwidth hinders the legitimate user from rapidly catching the displayed image. The displayed image is easy to be missed even by a slight movement of eyes. It causes inconvenience to the user, lowering the usability of the encoded medium 200.

For some image(s) selected from the plurality of images and intended to be viewed by the legitimate user, it may be desirable to broaden the beamwidth of the outgoing light beam 181 generated by each member RWG belonging to a RWG group corresponding to an individual selected image. The Inventors have found that instead of using periodic diffraction gratings, using aperiodic periodic gratings enables the broadening of the beamwidth, despite a slight reduction in maximum transmittance provided by each member RWG as observed in the outgoing light beam 181.

In certain preferable embodiments, one or more selected RWG groups in the plurality of RWG groups are configured to provide a broader beamwidth of the outgoing light beam 181 generated by each member RWG in the one or more selected RWG groups. Consider a member RWG in an individual selected RWG group. This member RWG adopts the model of the RWG 100 as disclosed above, and comprises an in-coupling diffraction grating 120, an out-coupling diffraction grating 130, and a waveguide 110 connected to the in-coupling and out-coupling diffraction gratings 120, 130. In particular, each of the in-coupling and out-coupling diffraction gratings 120, 130 is an aperiodic diffraction grating rather than a periodic one. It causes a beamwidth of the outgoing light beam 181 generated by this member RWG to be broadened. It thereby allows a second certain image selected from the plurality of images and intended to be created by the individual selected RWG group to be viewable by a person over a wider range of angle.

For illustration, FIGS. 4A and 4B depict cross-sectional views of a first member RWG 435a and of a second member RWG 435b, respectively, where the first member RWG 435a is realized with periodic diffraction gratings while the second member RWG 435b is realized with aperiodic diffraction gratings. The first member RWG 435a is formed with a first in-coupling diffraction grating 420a and a first out-coupling diffraction grating 430a. The first in-coupling diffraction grating 420a is a periodic diffraction grating, and includes first and second arrangements 421a, 422a of evenly-distributed nano-structured elements. The first out-coupling diffraction grating 430a is also a periodic diffraction grating, and includes third and fourth arrangements 431a, 432a of evenly-distributed nano-structured elements. Note that the second and fourth arrangements 422a, 432a of evenly-distributed nano-structured elements are absent if the first in-coupling and first out-coupling diffraction gratings 420a, 430a are single-sided rather than double-sided. The second member RWG 435b is formed with a second in-coupling diffraction grating 420b and a second out-coupling diffraction grating 430b. In contrast, the second in-coupling diffraction grating 420b is an aperiodic diffraction grating, and includes fifth and sixth arrangements 421b, 422b of nano-structured elements with non-uniform grating periods. Similarly, the second out-coupling diffraction grating 430b is an aperiodic diffraction grating, and includes seventh and eighth arrangements 431b, 432b of nano-structured elements with non-uniform grating periods. Also note that the sixth and eighth arrangements 422b, 432b of nano-structured elements are absent if the second in-coupling and second out-coupling diffraction gratings 420b, 430b are single-sided rather than double-sided.

Although the fifth to eighth arrangements 421b, 422b, 431b, 432b of nano-structured elements are non-periodic arrangements of nano-structured elements, these nano-structured-element arrangements 421b, 422b, 431b, 432b are close to periodic arrangements. Preferably, an individual non-periodic arrangement of nano-structured elements in forming the fifth to eighth arrangements 421b, 422b, 431b, 432b has a phase profile given by a periodic phase profile superimposed with a weakly-perturbed aperiodic phase profile. Specifically, the aperiodic phase profile is "weakly perturbed" in the sense that in the phase profile, the phase variation/perturbation for the nonlinear aperiodic term is small compared with the linear phase periodic term.

For the second member RWG 435b, the fifth and sixth arrangements 421b, 422b of nano-structured elements belong to the second in-coupling diffraction grating 420b and share one set of grating periods. Similarly, the seventh and eighth arrangements 431b, 432b of nano-structured elements belong to the second out-coupling diffraction grating 430b and share another set of grating periods. It is required to identify a distribution function of grating periods for an aperiodic diffraction grating. First, note that a phase profile of a periodic diffraction grating is given by $$\varphi_p = \varphi = \frac{2\pi}{P} x \quad (1)$$

where $\varphi_p$ denotes the phase profile of the periodic diffraction grating, $\varphi$ denotes a phase of a nano-structured element on the diffraction grating, P is a grating period, and x is a distance of the nano-structured element from a boundary of the diffraction grating. With reference to FIG. 1, x is measured along the direction 105. The phase profile of the aperiodic diffraction grating, $\varphi_{ap}$, is then given by $\varphi_p$ superimposed with $\Delta\varphi_{ap}$, which is the weakly-perturbed aperiodic phase profile. It follows that $$\varphi_{ap} = \varphi_p + \Delta\varphi_{ap}. \quad (2)$$

Note that since the aperiodic phase profile is weakly-perturbed, it follows that $\Delta\varphi_{ap}$ is small compared to $\varphi_p$. In certain embodiments, $\Delta\varphi_{ap}$ is given by $$\Delta\varphi_{ap} = \left[\frac{\pi}{f\lambda}\right] x^2 \quad (3)$$

where: f is a focal length of the lens-like parabolic phase profile defined by $\Delta\varphi_{ap}$ in EQN. (3); and $\lambda$ is the wavelength of incident light. Apart from a parabolic function, a quartic function is another choice in designing $\Delta\varphi_{ap}$. In certain embodiments, the weakly-perturbed aperiodic phase profile is a parabolic or quartic function modulo 2π.

Figure 5B:
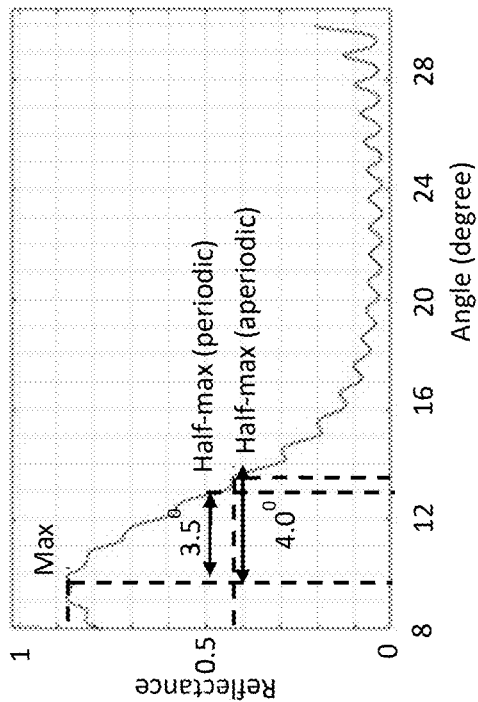
FIG. 5B provides a second plot of reflectance value versus angle of observing an outgoing light beam generated by the second member RWG of FIG. 4B as obtained from simulation.
Figure 5A:
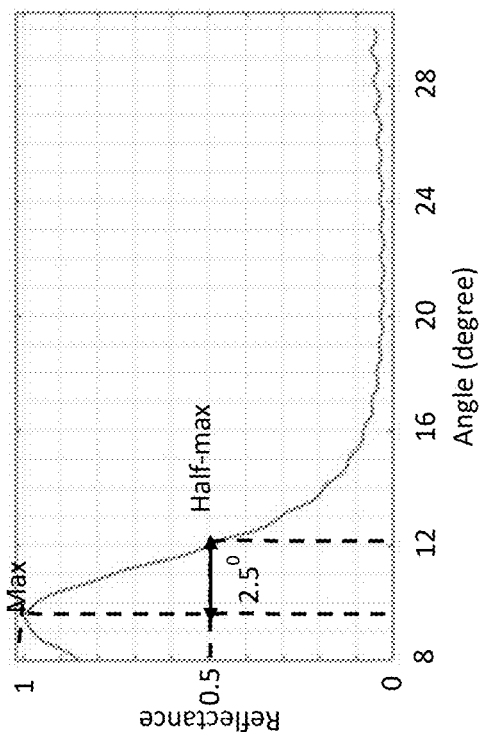
FIG. 5A provides a first plot of reflectance value versus angle of observing an outgoing light beam generated by the first member RWG of FIG. 4A as obtained from simulation.

FIGS. 5A and 5B provide plots of reflectance value versus angle of observing an outgoing light beam generated by the first member RWG 435a (which uses periodic diffraction gratings) and the second member RWG 435b (which uses aperiodic diffraction gratings), respectively, as obtained by simulation under a test condition of observing an outgoing light beam at a wavelength of 550 nm. In case periodic diffraction gratings are used, the half-maximum reflectance point occurs at an angle of 2.5° from the maximum reflectance point as shown in FIG. 5A. If aperiodic diffraction gratings instead of periodic ones are used, the half-maximum reflection point is widened to 4.0° as shown in FIG. 5B. For comparison, a corresponding half-maximum reflection point in case of using periodic diffraction gratings is found to be 3.5° after adjustment is made due to a lower value of maximum reflection point. The aforementioned results demonstrate that using aperiodic diffraction gratings provides a wider view angle to the user than using periodic ones.

Figure 6:
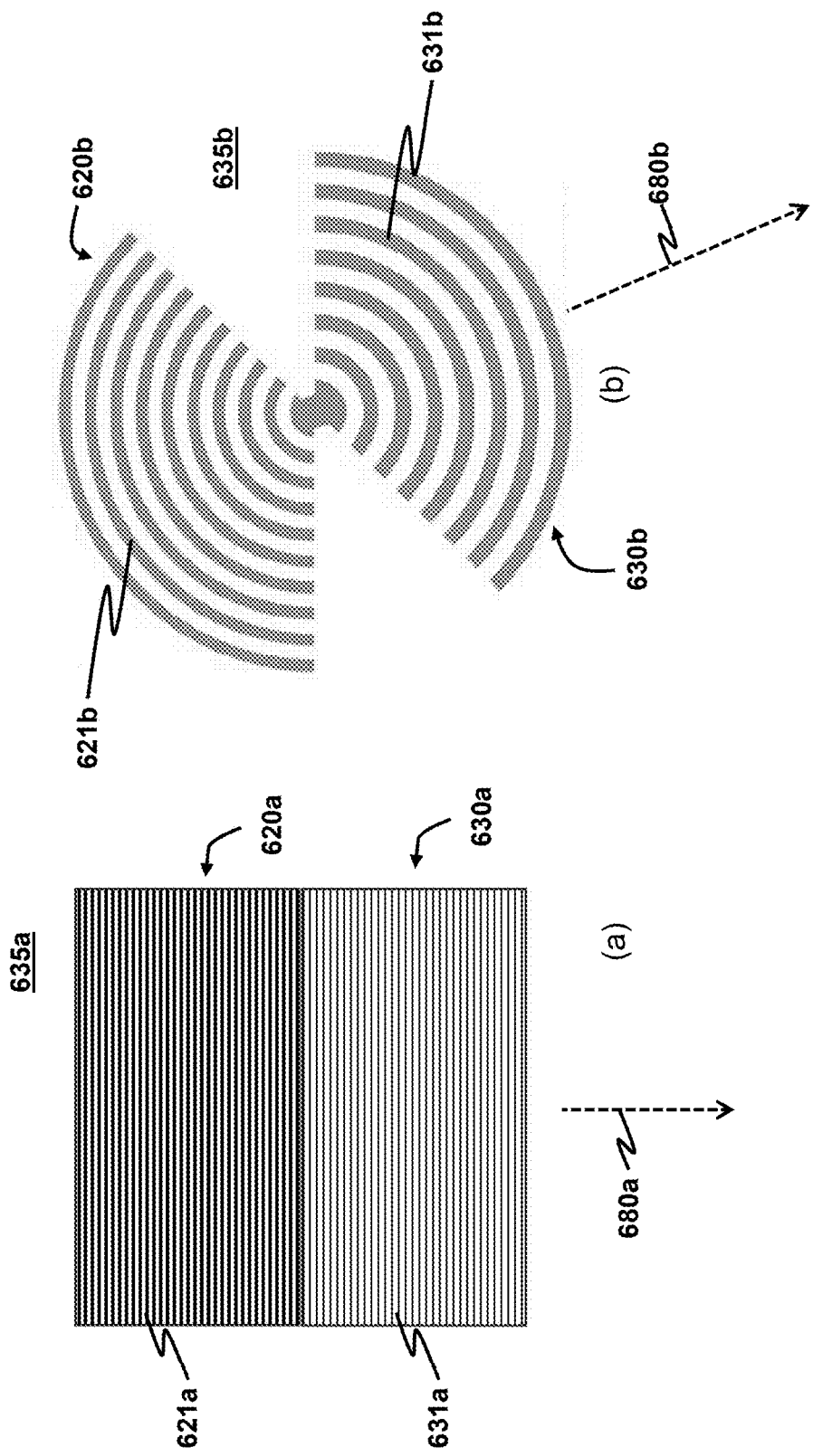
FIG. 6 depicts two RWGs, one using linear nano-structured elements and another one using curved nano-structured elements for broadening a range of view angle in human seeing of displayed images.

In addition to using aperiodic diffraction gratings instead of periodic ones, the beamwidth of the outgoing light beam 181 may be further broadened by using curved nano-structured elements instead of linear ones. FIG. 6 depicts a first RWG 635a and a second RWG 635b. The first RWG 635a employs linear (i.e. straight) nano-structured elements 621a, 631a for both in-coupling and out-coupling diffraction gratings 620a, 630a, respectively. The first RWG 635a has an orientation 680a. The second RWG 635b employs curved (e.g., semi-circular) nano-structured elements 621b, 631b for both in-coupling and out-coupling diffraction gratings 620b, 630b, respectively. The second RWG 635b has an orientation 680b. U.S. Pat. No. 11,358,407 demonstrates that the second RWG 635b offers a wider view angle to a user than the first RWG 635a does.

In certain scenarios, it may be desirable to offer a higher degree of data-hiding capability to one or more selected images in the plurality of images in order to avoid catching an adversary's notice on the one or more selected images. One means as disclosed above is to maintain a very narrow beamwidth to the outgoing light beam 181 by using periodic diffraction gratings in member-RWG realization. In addition to this means, the data-hiding capability may be increased by intentionally setting the one or more selected images to be invisible. The Inventors notice that IR light can be used to store patterns or images that can only be read by special device readers/sensors like InGaAs in the IR regime and thus can produce a truly covert feature that cannot be visualized by human eyes. Indeed, it introduces extra barrier for a potential infringer to spoof this optical security system. Furthermore, the resonance of the RWG 100 occurs at a very narrow bandwidth in the IR region. It follows that it is difficult for the infringer to know the correct wavelength to use to produce the IR covert image.

In certain embodiments, the one or more selected images are made invisible to a human user by the following arrangement. The one or more selected images are generated by one or more selected RWG groups in the plurality of RWG groups. A corresponding outgoing light beam associated with an individual selected RWG group is configured or designed to have a spectral content outside a visible spectrum of human beings. For instance, the corresponding outgoing light beam may be generated in the near IR band close to the red light. or in the UV band close to the violet light. As a result, it causes a third certain image selected from the plurality of images and intended to be created by the individual selected RWG group to be invisible to human beings. It thereby allows the third certain image to carry hidden information.

Figure 7:
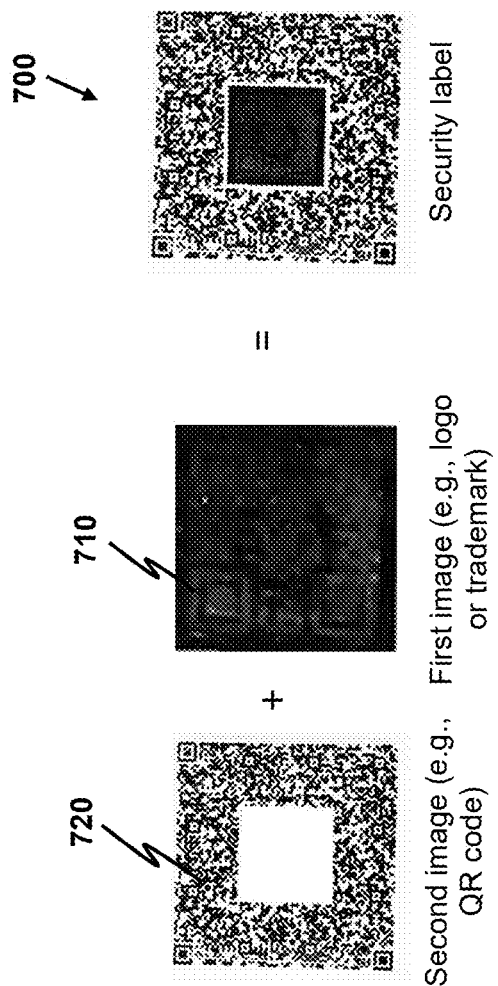
FIG. 7 depicts one practical realization of the encoded medium as a security label.

FIG. 7 depicts a practical realization of the encoded medium 200 as an example for illustration. The encoded medium 200 is realized as a security label 700 attached to a certain article. The security label 700 may be used for establishing that the article is an authentic product. In particular, the plurality of images carried in the security label 700 includes a first image 710 and a second image 720. The first image 710 may be a logo or a trademark for brand identification of the article. The second image 720 may be a QR code containing digital data used for authentication of the article.

A second aspect of the present disclosure is to provide an optical-digital encoding-decoding system based on using any embodiment of the encoded medium 200.

FIG. 8 depicts a schematic model of an exemplary optical-digital encoding-decoding system 800. The system 800 comprises an encoded medium 810 and a decoding device 820.

The encoded medium 810 is used for displaying a plurality of images 815 in an angle-multiplexed manner. Specifically, the encoded medium 810 is realized as any one of the embodiments of the above-disclosed encoded medium 200. Furthermore, it is intended that digital data are encoded in one or more images in the plurality of images 815.

The decoding device 820 is used for decoding the displayed plurality of images 815. The decoding device 820 comprises a camera 830 and a computing processor 840. The camera 830 is used for optically retrieving the plurality of images 815 sent out from the encoded medium 810. The computing processor 840 is configured to execute a computing process for controlling the camera 830 to retrieve the plurality of images 815 and processing the retrieved plurality of images 815.

Note that the encoded medium 810 displays the plurality of images 815 when the encoded medium 810 is illuminated with light having spectral components covering spectral contents of the plurality of images 815. In certain embodiments, the decoding device 820 further comprises a light source 850 for controllably illuminating the encoded medium 810. The light source 850 is controllable by the computing processor 840. Usually, the light source 850 is a low coherent light source configured to generate low-coherent light or flash light for illuminating the encoded medium 810.

In certain embodiments, the decoding device 820 is a smartphone.

Figure 9:
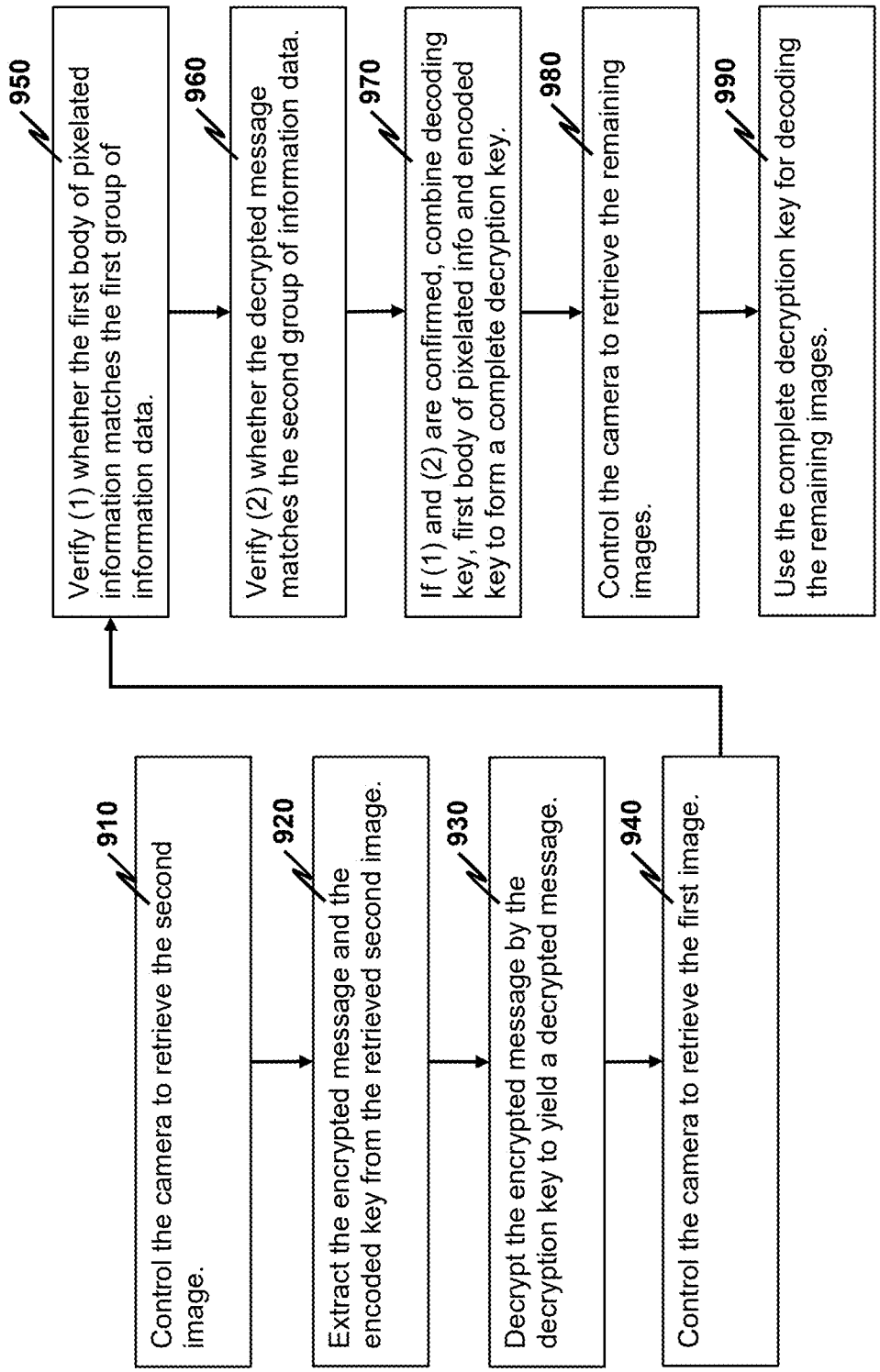
FIG. 9 depicts a flowchart showing exemplary steps of a computing process used by the decoding device for processing the retrieved images in accordance with certain embodiments of the present disclosure.

FIG. 9 depicts a flowchart showing exemplary steps of the computing process in accordance with certain embodiments of the present disclosure. The computing process is developed under the following conditions. The plurality of images 815 includes first and second images. The first image is encoded with a first body of pixelated information. The second image is encoded with a second body of pixelated information. The second body of pixelated information includes an encrypted message and an encoded key. The decoding device 820 is stored with: a first group of information data for verifying the first body of pixelated information; a decryption key for decrypting the encrypted message; a second group of information data for verifying the encrypted message after decryption; and a decoding key for assisting decoding of remaining images in the plurality of images 815 other than the first and second images.

The computing process executed by the computing processor 840 comprises steps 910, 920, 930, 940, 950, 960, 970, 980 and 990. In the step 910, the camera 830 is controlled to retrieve the second image. From the retrieved second image, the encrypted message and the encoded key are extracted in the step 920. In the step 930, the encrypted message is decrypted by the decryption key to yield a decrypted message. The camera 830 is then controlled to retrieve the first image in the step 940. In the step 950, whether the first body of pixelated information matches the first group of information data is verified. In the step 960, whether the decrypted message matches the second group of information data is verified. The step 970 checks if the first body of pixelated information matches the first group of information data and the decrypted message matches the second group of information data. If it is found that both matchings are confirmed, then the step 970 is further executed to combine the decoding key, the first body of pixelated information and the encoded key to form a complete decryption key used for decoding the remaining images. In the step 980, the camera 830 is controlled to retrieve the remaining images. The step 990 then uses the complete decryption key for decoding the remaining images.

Figure 10:
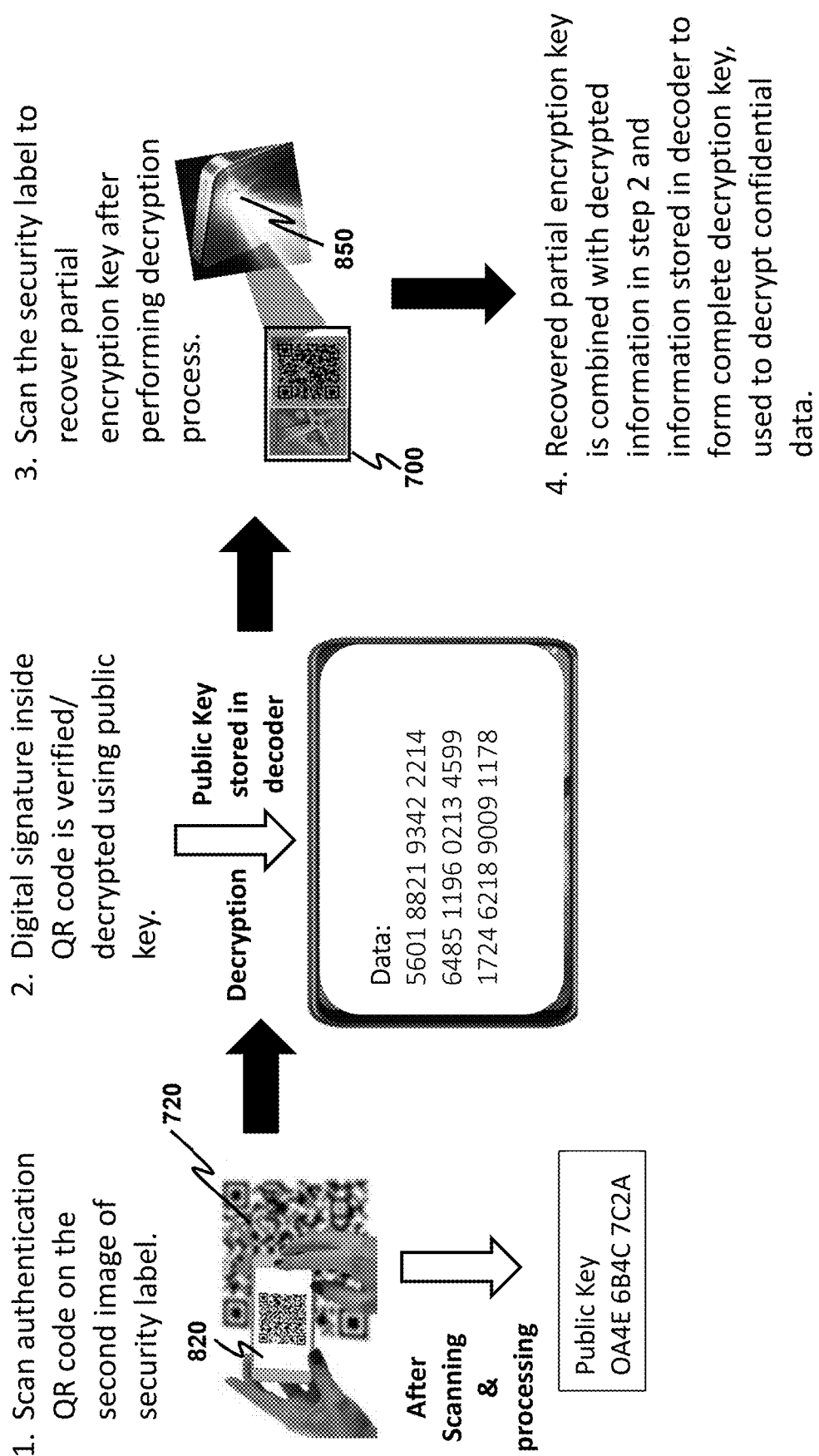
FIG. 10 provides an example of using the disclosed optical-digital encoding-decoding system for achieving strong authentication.

FIG. 10 provides an example of using the disclosed system 800 for achieving strong authentication, where the encoded medium 810 is the security label 700 as shown in FIG. 7. Four steps are taken in the example.

In the first step, the decoding device 820, which is a smartphone, scans an authentication QR code on the second image 720 of the security label 700. The QR code as obtained in the scanning is checked for its authenticity by using a public key, which is stored in the smartphone 820. Specifically, in the second step, the digital signature inside the obtained QR code is verified and decrypted by using the stored public key. In the third step, the security label 700 is scanned to recover a partial encryption key after performing a decryption process. In the fourth step, the recovered partial encryption key is combined with decrypted information obtained in the second step and information stored in the smartphone 820 to form a complete decryption key. The complete decryption key is then used to decrypt confidential data.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. An encoded medium for displaying a plurality of images in an angle-multiplexed manner, the encoded medium comprising:
   a display area pixelated into a set of pixels, each image being associated with a subset of pixels for image display on the display area; and
   a plurality of resonant waveguide grating (RWG) groups for respectively creating the plurality of images on the display area, an individual RWG group being associated with an outgoing-beam propagation direction with respect to the display area and consisting of plural member RWGs each configured to generate an outgoing light beam propagated along the outgoing-beam propagation direction, the member RWGs being distributed over the subset of pixels associated with a first certain image selected from the plurality of images and intended to be created by the individual RWG group such that each pixel in the subset of pixels associated with the first certain image is allocated with at least one of the member RWGs, wherein respective RWG groups are further configured to provide different respective outgoing-beam propagation directions for angle-multiplexing the plurality of images in image display.

2. The encoded medium of claim 1, wherein an individual pixel in the set of pixels is partitioned into a plurality of subpixels, the plurality of subpixels being respectively assigned to the plurality of RWG groups for member-RWG allocation in the individual pixel.

3. The encoded medium of claim 2, wherein the individual pixel in the set of pixels is two-dimensionally partitioned into the plurality of subpixels such that respective subpixels in the plurality of subpixels are distributed on the individual pixel.

4. The encoded medium of claim 2, wherein the individual pixel in the set of pixels is three-dimensionally partitioned into the plurality of subpixels such that respective subpixels in the plurality of subpixels are distributed over a plurality of planar layers formed along a normal direction to the display area.

5. The encoded medium of claim 2, wherein an assignment scheme for respectively assigning the plurality of subpixels located at a certain pixel to the plurality of RWG groups varies over the set of pixels for increasing a cost incurred by an adversary in reverse-engineering the encoded medium.

6. The encoded medium of claim 1, wherein:
   the plurality of RWG groups includes one or more selected RWG groups;
   an individual member RWG in an individual selected RWG group comprises an in-coupling diffraction grating, an out-coupling diffraction grating, and a waveguide connected to the in-coupling and out-coupling diffraction gratings; and
   each of the in-coupling and out-coupling diffraction gratings is an aperiodic diffraction grating rather than a periodic one, causing a beamwidth of the outgoing light beam generated by the individual member RWG in the individual selected RWG group to be broadened to thereby allow a second certain image selected from the plurality of images and intended to be created by the individual selected RWG group to be viewable over a wider range of angle.

7. The encoded medium of claim 6, wherein the aperiodic diffraction grating is formed with one or two aperiodic arrangements of nano-structured elements, an individual aperiodic arrangement of nano-structured elements having a phase profile given by a periodic phase profile superimposed with a weakly-perturbed aperiodic phase profile.

8. The encoded medium of claim 7, wherein the weakly-perturbed aperiodic phase profile is a parabolic or quartic function modulo $2\pi$.

9. The encoded medium of claim 6, wherein the aperiodic diffraction grating is formed with one or two aperiodic arrangements of nano-structured elements, wherein each nano-structured element is curved rather than linear, causing the beamwidth of the outgoing light beam generated by the individual member RWG in the individual selected RWG group to be further broadened.

10. The encoded medium of claim 6, wherein the aperiodic diffraction grating is formed with two aperiodic arrangements of nano-structured elements, the two aperiodic arrangements of nano-structured elements being respectively positioned on two opposite sides of the waveguide.

11. The encoded medium of claim 6, wherein the aperiodic diffraction grating is formed with one or two aperiodic arrangements of nano-structured elements, each nano-structured element having a cross-sectional shape selected from a rectangular shape, a triangular shape, a sinusoidal shape and a slanted rectangular shape.

12. The encoded medium of claim 1, wherein:
   each member RWG in the plurality of RWG groups comprises an in-coupling diffraction grating, an out-coupling diffraction grating, and a waveguide connected to the in-coupling and out-coupling diffraction gratings; and
   the in-coupling and out-coupling diffraction gratings are periodic diffraction gratings mutually different in grating periodicity.

13. The encoded medium of claim 1, wherein:
   the plurality of RWG groups includes one or more selected RWG groups; and
   a corresponding outgoing light beam associated with an individual selected RWG group has a spectral content outside a visible spectrum of human beings, causing a third certain image selected from the plurality of images and intended to be created by the individual selected RWG group to be invisible to human beings to thereby allow the third certain image to carry hidden information.

14. The encoded medium of claim 1, wherein:
   the encoded medium is a security label attached to an article; and
   the plurality of images includes:
      a first image of a logo or trademark for brand identification of the article; and a second image of a quick response (QR) code containing digital data used for authentication of the article.

15. An optical-digital encoding-decoding system comprising:
    the encoded medium of claim 1 for displaying a plurality of images in an angle-multiplexed manner; and
    a decoding device comprising:
        a camera for optically retrieving the plurality of images from the encoded medium; and
        a computing processor configured to execute a computing process for controlling the camera to retrieve the plurality of images and processing the retrieved plurality of images.

16. The system of claim 15, wherein the decoding device further comprises a light source for controllably illuminating the encoded medium.

17. The system of claim 15, wherein:
    the plurality of images includes first and second images, the first image being encoded with a first body of pixelated information, the second image being encoded with a second body of pixelated information, the second body of pixelated information including an encrypted message and an encoded key;
    the decoding device is stored with a first group of information data for verifying the first body of pixelated information, a decryption key for decrypting the encrypted message, a second group of information data for verifying the encrypted message after decryption, and a decoding key for assisting decoding of remaining images in the plurality of images other than the first and second images; and
    the computing process comprises:
        controlling the camera to retrieve the second image;
        extracting the encrypted message and the encoded key from the retrieved second image;
        decrypting the encrypted message by the decryption key to yield a decrypted message;
        controlling the camera to retrieve the first image;
        verifying whether the first body of pixelated information matches the first group of information data;
        verifying whether the decrypted message matches the second group of information data;
        responsive to finding that the first body of pixelated information matches the first group of information data and the decrypted message matches the second group of information data, combining the decoding key, the first body of pixelated information and the encoded key to form a complete decryption key used for decoding the remaining images;
        controlling the camera to retrieve the remaining images; and
        using the complete decryption key for decoding the remaining images.

* * * * *